July 1, 1969 J. D. BAGLEY 3,453,387

DATA TRANSMISSION SYSTEM HAVING DELAY LINE BUFFER STORAGE

Filed Oct. 4, 1965

INVENTOR.
JOHN D. BAGLEY
BY John J. Goodwin
ATTORNEY

July 1, 1969 J. D. BAGLEY 3,453,387

DATA TRANSMISSION SYSTEM HAVING DELAY LINE BUFFER STORAGE

Filed Oct. 4, 1965 Sheet 5 of 7

United States Patent Office 3,453,387
Patented July 1, 1969

3,453,387
DATA TRANSMISSION SYSTEM HAVING DELAY LINE BUFFER STORAGE

John D. Bagley, Katonah, N.Y., assignor to International Business Machines Corporation, Armonk, N.Y., a corporation of New York Filed Oct. 4, 1965, Ser. No. 492,629
Int. Cl. H04l 15/26, 3/00
U.S. Cl. 178—17.5 10 Claims

ABSTRACT OF THE DISCLOSURE

A buffer storage between a typewriter terminal and a central processing unit (CPU) communicates with the terminal asynchronously by 8 bit bytes for each character and with the CPU at a higher rate and serially by bits. The storage device is a recirculating delay line and stores each bit of both data and control information in the form of two bit groups. A Start of Message character proceeds each set of stored bits and is cancelled as any bit is read from storage and is rewritten immediately before the next remaining bit. Also an End of Message group immediately follows the last stored bit of information and is replaced by the bits as they are stored. A new End of Message character is written after each bit grouping as it is stored. The delay line does not have any fixed starting point for storage and information may be stored in any unitary section. An open ended tapped delay line is driven by a pulse to generate necessary control timings.

OBJECTS OF THE INVENTION

The present invention relates to data transmission and processing systems and more particularly to a data transmission system incorporating a delay line as a buffer storage means.

Buffer storage devices are employed as interfaces between two units where the data handling rates of the two units differ, or to assemble complete portions of data from one unit before transmitting it to another unit. In the present invention, a system is described wherein a buffer storage means is employed to receive and assemble messages constructed on an input device by an operator and to then transmit the assembled message to a transmission line at a different transmission rate, and conversely, to receive and assemble messages received on the transmission line and to present the asembled messages to the operator via an output device.

An object of the present invention is to provide a data transmission and processing system including a delay line as an unallocated buffer storage element.

Another object of the present invention is to provide a data transmission and processing system including a buffer storage element wherein data and control information is represented in two bit increments.

A further object of the present invention is to provide a data transmission and processing system including a buffer storage element having a recirculating buffer delay line and means for identifying data and control information recirculating in the buffer delay line.

Still another object of the present invention is to provide a data transmission and processing system having a stable and accurate transmission line timing means in the buffer storage element which operates at transmission line speeds and is started from a point remote from the buffer storage element.

The foregoing and other objects, features and advantages of the invention will be apparent from the following more particular description of a preferred embodiment of the invention, as illustrated in the accompanying drawings.

DRAWINGS

Figures 3, 3A:
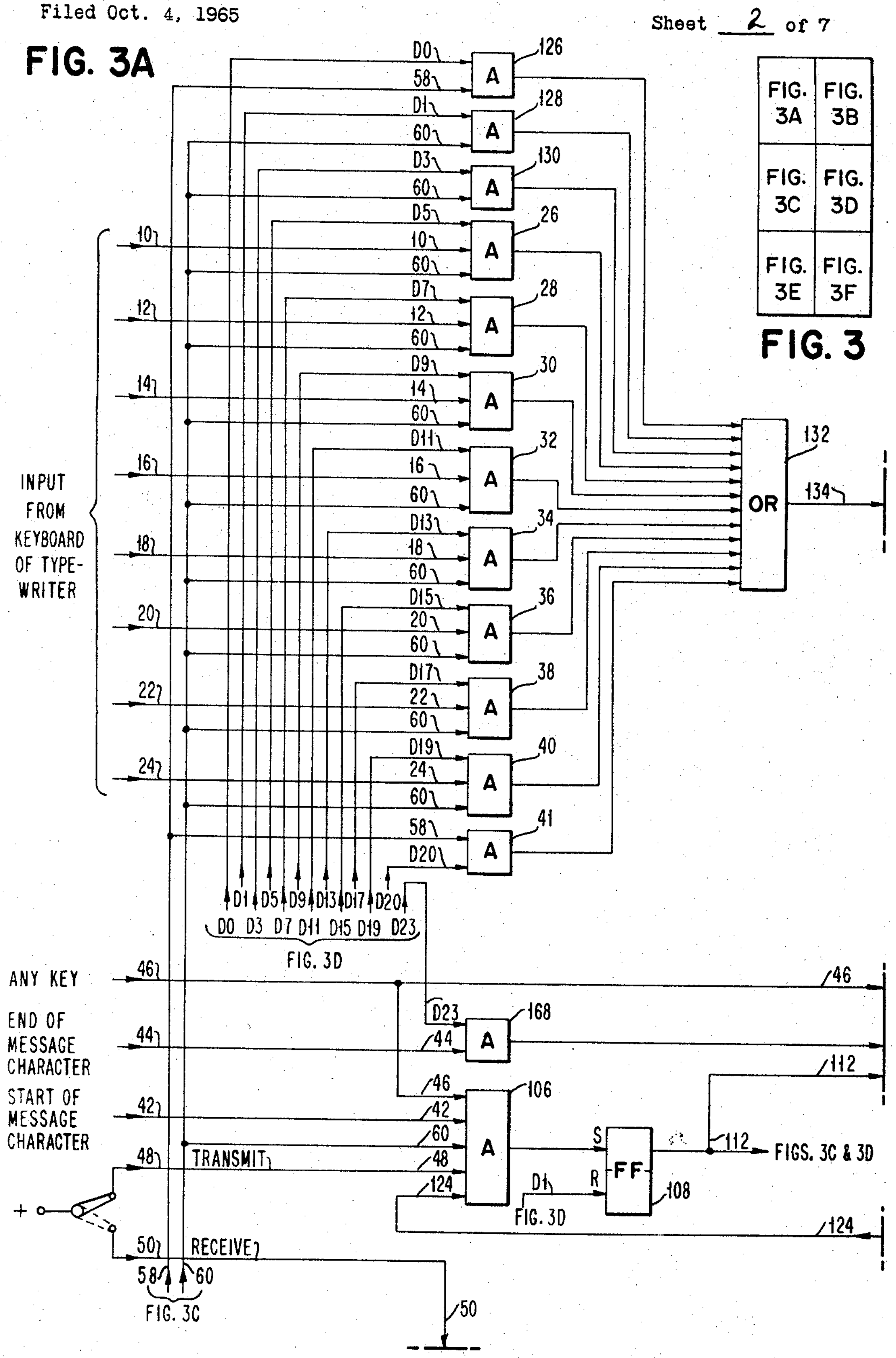
FIG. 3 is an illustration of how FIGS. 3A, 3B, 3C, 3D, 3E, and 3F should be combined.

FIGS. 3A through 3F, when combined according to FIG. 3, form a schematic diagram of an embodiment of a transmission terminal according to the present invention.

PREFERRED EMBODIMENTS

Figure 1:
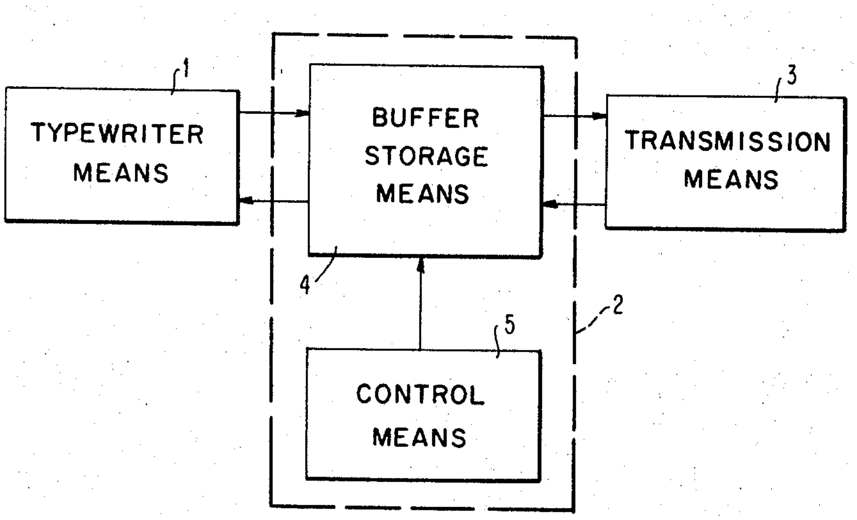
FIG. 1 is a schematic block diagram of an embodiment of a data transmission and procesing system in accordance with the principles of the present invention.

The system of the present invention as shown in FIG. 1 includes three major units: a typewriter means 1; a transmission means 3; and a buffer terminal 2 connected therebetween including a buffer storage means 4 and a control means 5, therefor.

The system functions as an interface between a human operator and a remote terminal, for example, a data processor. The operator enters data into the system by means of the typewriter 1. The characters which are generated are serialized and stored in the buffer storage means 4. When a complete message has been entered, it is transferred serially to the transmission means 3 for transmission to a remote terminal such as a data processor. In the opposite mode messages are generated at the remote terminal and transmitted on the transmission means 3. Each character received on the transmission means 3 is assembled in the buffer storage means 4 and transferred in parallel to the typewriter 1 where it is printed out.

In the present embodiment a recirculating delay line, being a sequential access memory device, is employed organized as an unallocated buffer store. The information stored therein is coded into two bit bytes with the following coding:

11—Start of message
00—Zero bit
01—One bit
10—End of message

A typical message, say 1011010 would look like this: 11 01 00 01 01 00 01 00 10 when recirculating in the buffer delay line. A two phase clock is employed with the phases labeled D (data) and T (timing). The phase relationship between the timing information, the control information, and the data information is shown in FIG. 2.

Figure 2:
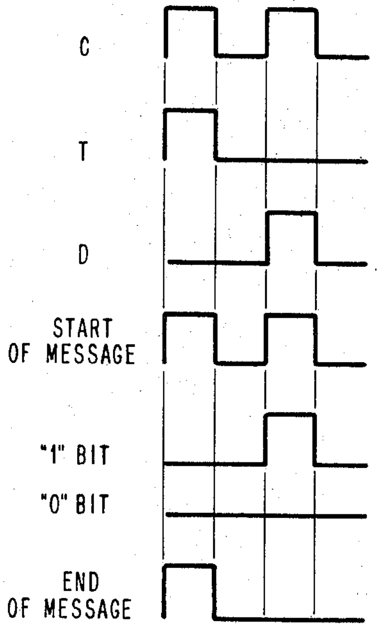
FIG. 2 is an illustration of the waveforms of the timing, data, and control signals employed in the present system.

As can be seen in FIG. 2, a 1 bit occurring at the same time as a T pulse indicates control information, while a 0 bit indicates data. This type of coding on a single delay line storage is equivalent to a system which employes two distinct lines—each running at one-half of the basic clock frequency. Thus, in the present system a single delay line is being time shared and is used for both timing and storage.

The system has two major modes of operation. A transmit mode wherein data is transferred from the typewriter 1 to the transmission line 3, and the receive mode wherein data is transferred from the transmission line 3 to the typewriter 1 which prints it out to the operator. During either of these two major modes of operation, transmit or receive, there are actually two different phases or sub-modes included. In the transmit mode the operator first types in information on the typewriter and it will enter the buffer storage means 4 until the complete message has been assembled. This is referred to as the storage sub-mode. As soon as the message has been completely stored in the buffer storage means 4, the system will go into the transfer sub-mode portion of the transmit mode wherein information is removed from the delay buffer storage means 4 and transferred onto the transmission line 3. In the receive mode, the buffer storage means 4 will be used as a single character assembly area in the storage sub-mode wherein it will receive bits serial by bit-serial by character from the transmission line 3 and will store the series of bits until the eight bits necessary to represent a character are present. At that time, in the transfer sub-mode the buffer storage means 4 is read out to the typewriter 1 where the character that was transmitted is printed.

More particularly, in the transmit mode information is entered into the buffer storage means 4 from the typewriter 1 one character at a time. The first character entered is preceded by a start of message mark (11) and terminated by an end of message mark (10). In order to enter each succeeding character, the end of message mark of the message is located and overwritten by the character being entered. Each input character is terminated by an end of message mark. When the start of message mark is detected immediately following the end of message mark, the buffer storage means is filled. When a complete message has been entered into the buffer delay line as indicated by the depression of an end of message key, or by a full buffer condition as indicated by a start of message mark following an end of message mark, the contents of the buffer storage means 4 are read out to the transmission line 3 in the transfer sub-mode. Information is read out of the buffer storage means 4 one bit at a time. In the transfer sub-mode of the transmit

DETAILED DESCRIPTION

For a more detailed description, reference is made to FIGS. 3A through 3F. In FIGS. 3A through 3F the typewriter 1 and the transmission line 3 are omitted. Typewriter 1 is an input-output typewriter having a keyboard of the type which, when the keys are depressed, will generate coded electrical signals which form eight bit characters representative of the character associated with the depressed key. The typewriter is also responsive to similarly coded input signals and contains a printer mechanism which causes the character print element associated with the coded eight bit input signal to strike and print out the character. The IBM Model 731 typewriter is one example of a typewriter which may be used in this embodiment.

The transmission means 3 is any suitable transmission mode suitable to the use for which the system is being employed. It may, for example, be a standard Teletypewriter or telephone line.

Any necessary conversion means between the typewriter or transmission line and the buffer delay means, such as level setting networks, code converters or modulator-demodulators, which do not pertain directly to this invention are presumed to be included. In FIG. 3A there are eight data lines, 10, 12, 14, 16, 18, 20, 22 and 24 which are connected from the relays of the keyboard to AND circuits 26, 28, 30, 32, 34, 36, 38 and 40, respectively. Signals appear on combinations of the data lines, for example, in accordance with the double parity BCD (binary coded decimal) code which is shown in the following table.

TABLE

| Line 10 | 12 | 14 | 16 | 18 | 20 | 22 | 24 | Character | Line 10 | 12 | 14 | 16 | 18 | 20 | 22 | 24 | Character |
|---|---|---|---|---|---|---|---|---|---|---|---|---|---|---|---|---|---|
| 0 | 0 | 0 | 0 | 0 | 0 | 0 | 0 | Blank | | | | | | | | | |
| 1 | 0 | 0 | 0 | 0 | 0 | 1 | 0 | 1 | 1 | 0 | 0 | 0 | 0 | 1 | 1 | 1 | J |
| 0 | 1 | 0 | 0 | 0 | 0 | 0 | 1 | 2 | 0 | 1 | 0 | 0 | 0 | 1 | 0 | 0 | K |
| 1 | 1 | 0 | 0 | 0 | 0 | 1 | 1 | 3 | 1 | 1 | 0 | 0 | 0 | 1 | 1 | 0 | L |
| 0 | 0 | 1 | 0 | 0 | 0 | 1 | 0 | 4 | 0 | 0 | 1 | 0 | 0 | 1 | 1 | 1 | M |
| 1 | 0 | 1 | 0 | 0 | 0 | 0 | 0 | 5 | 1 | 0 | 1 | 0 | 0 | 1 | 0 | 1 | N |
| 0 | 1 | 1 | 0 | 0 | 0 | 1 | 1 | 6 | 0 | 1 | 1 | 0 | 0 | 1 | 1 | 0 | O |
| 1 | 1 | 1 | 0 | 0 | 0 | 0 | 1 | 7 | 1 | 1 | 1 | 0 | 0 | 1 | 0 | 0 | P |
| 0 | 0 | 0 | 1 | 0 | 0 | 0 | 1 | 8 | 0 | 0 | 0 | 1 | 0 | 1 | 0 | 0 | Q |
| 1 | 0 | 0 | 1 | 0 | 0 | 1 | 1 | 9 | 1 | 0 | 0 | 1 | 0 | 1 | 1 | 0 | R |
| | | | | | | | | | 1 | 0 | 1 | 1 | 0 | 1 | 0 | 0 | *(SOM$_c$) |
| 0 | 0 | 0 | 0 | 1 | 0 | 1 | 0 | 0 | | | | | | | | | |
| | | | | | | | | | 1 | 0 | 0 | 0 | 1 | 1 | 0 | 1 | A |
| 0 | 1 | 0 | 0 | 1 | 0 | 1 | 1 | S | 0 | 1 | 0 | 0 | 1 | 1 | 1 | 0 | B |
| 1 | 1 | 0 | 0 | 1 | 0 | 0 | 1 | T | 1 | 1 | 0 | 0 | 1 | 1 | 0 | 0 | C |
| 0 | 0 | 1 | 0 | 1 | 0 | 0 | 0 | U | 0 | 0 | 1 | 0 | 1 | 1 | 0 | 1 | D |
| 1 | 0 | 1 | 0 | 1 | 0 | 1 | 0 | V | 1 | 0 | 1 | 0 | 1 | 1 | 1 | 1 | E |
| 0 | 1 | 1 | 0 | 1 | 0 | 0 | 1 | W | 0 | 1 | 1 | 0 | 1 | 1 | 0 | 0 | F |
| 1 | 1 | 1 | 0 | 1 | 0 | 1 | 1 | X | 1 | 1 | 1 | 0 | 1 | 1 | 1 | 0 | G |
| 0 | 0 | 0 | 1 | 1 | 0 | 1 | 1 | Y | 0 | 0 | 0 | 1 | 1 | 1 | 1 | 0 | H |
| 1 | 0 | 0 | 1 | 1 | 0 | 0 | 1 | Z | 1 | 0 | 0 | 1 | 1 | 1 | 0 | 0 | I |
| 0 | 0 | 1 | 1 | 1 | 0 | 0 | 1 | Space | 0 | 0 | 1 | 1 | 1 | 1 | 0 | 0 | %(EOM$_c$) |

NOTE.—The asterisk key (*) is used as the start of message key and the percent key (%) is used as the end of message key.

mode the start of message mark is detected, the following data bit is read out, and a start of message mark is entered in place of the removed bit. When the end of message mark is detected immediately following a start of message mark, the buffer storage means 4 is empty. The length of the recirculating delay line in the storage means 4 in the embodiment is chosen so that a bit is removed every fourth revolution. Thus, the delay line provides an extremely accurate and stable clock for the transmission line date.

In the receive mode, information is entered into the buffer storage means 4 from the transmission line 3 one bit at a time. The first bit is preceded by a start of message mark and terminated by an end of message mark. Each succeeding bit is written over the end of message mark and terminated by its own end of message mark. When a complete nine bit character (eight data bits preceded by a "one" bit as a start of character bit) is assembled, it is read out into the typewriter within a single buffer delay in character time, that is, before the first bit of the next character arrives on the transmission line.

The start of message character and end of message character lines 42 and 44, respectively, are pulsed when the corresponding keys are depressed on the keyboard. The length of the pulses on the preceding lines is on the order of 50 milliseconds. A short pulse (9 microseconds) appears on the "any key" line 46 whenever any of the keys of the keyboard are struck.

The transmit and receive lines 48 and 50 terminate the mode of operation of the system and are activated by a switch 52 or else by an automatic control or other type device. At any one time the system is either in the transmit mode or the receive mode and this is indicated by a signal on either line 48 or line 50.

Figure 3B:
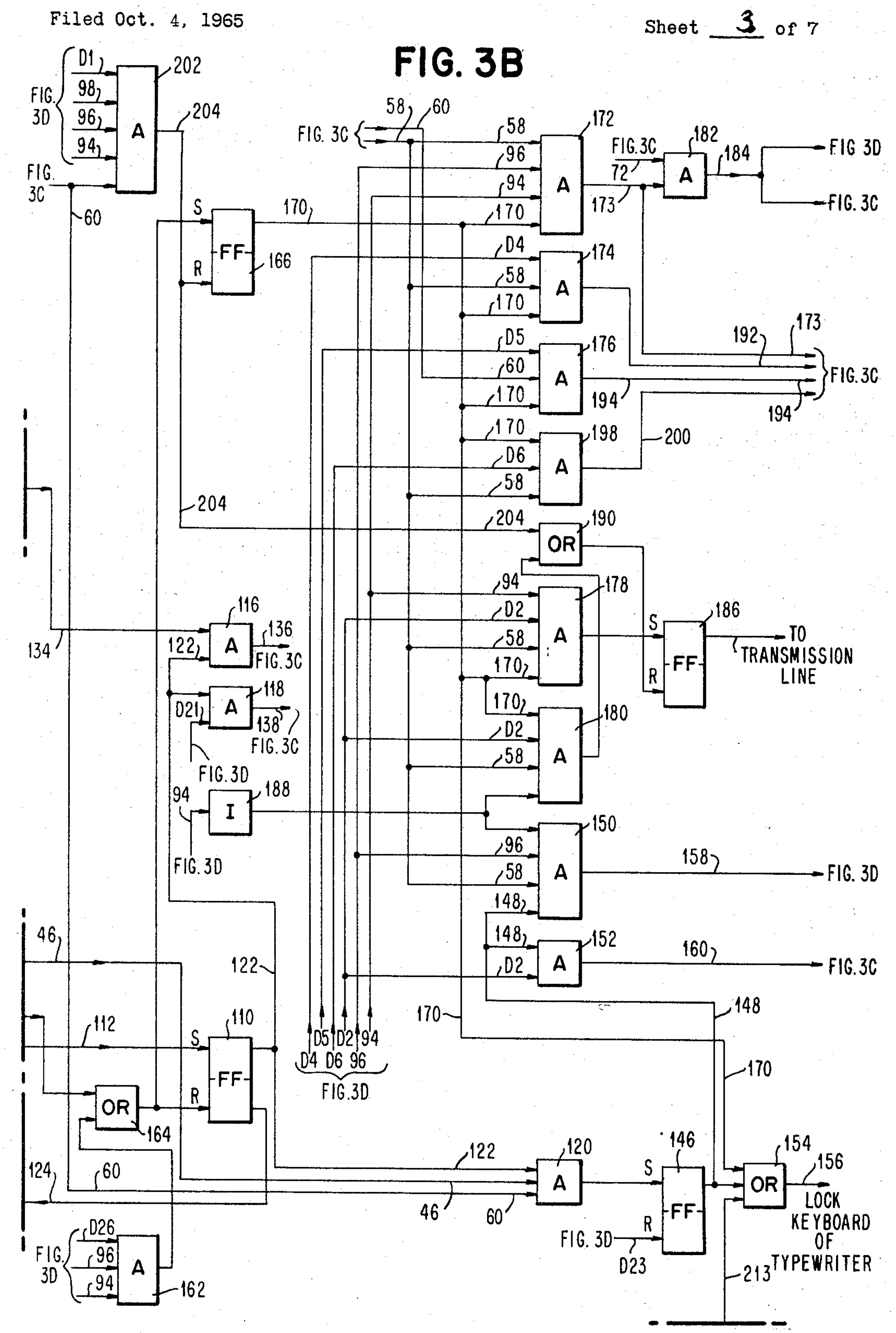
Figure 3C:
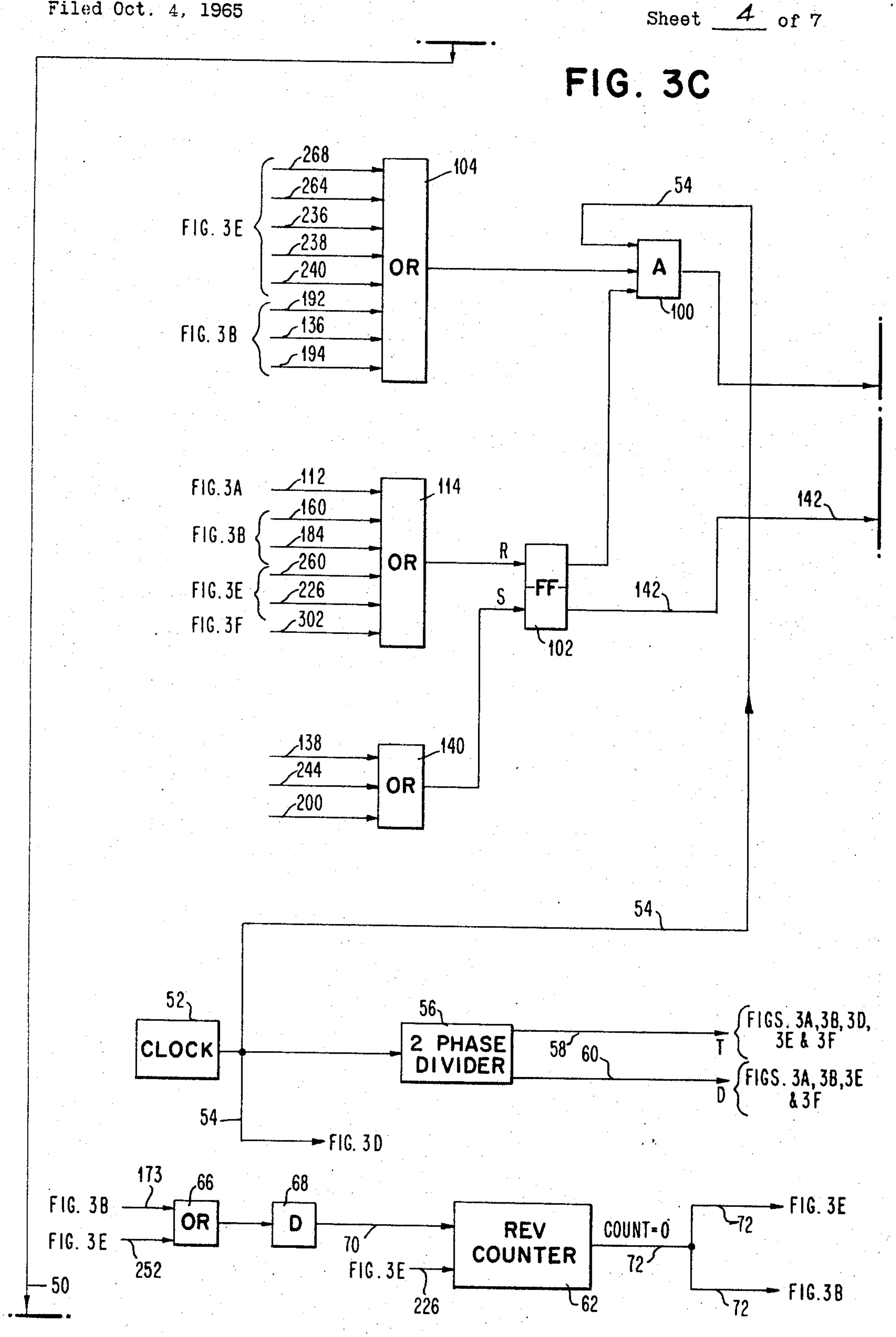

Clock means 52 for the system is shown in FIG. 3C and produces pulses which are ½ microsecond wide at a one megacycle rate on line 54. The output of clock 52 is subdivided into two phase related clock signals by phase divider 56. The two signals are referred to as the T (timing) signal which appears on line 58 and D (data) signal which appears on line 60.

A revolution counter circuit 62 (FIG. 3C) is provided and is used to count the revolutions of a main recirculating delay line 64 and consists of a two-stage binary counter. Revolution counter 62 is stepped by a signal on line 70 applied through an OR circuit 66 and a ½ microsecond delay line 68. Revolution counter 62 is reset to "one" via a signal on lead 226 and there is an output signal on the "count equals zero" line 72 from revolution counter 62 whenever the counter 62 reads "zero." The count progresses "zero," "one," "two," "three," "zero," "one," . . . etc.

An event time line 74 (FIG. 3D) is also provided and consists of a number of series connected, tapped, electromagnetic delay lines having a total delay of 26 microseconds. An input pulse may enter event time line 74 via OR circuit 76 and AND circuit 78 and will appear one microsecond later at the tap labeled D1 and three microseconds later at tap D3, and so on. As will be later seen, the system logic is arranged so that there is only a single pulse traveling down the event time line 74 at any given time. The AND circuit 78 connected between OR circuit 76 and the input to event time line 74 has as its other input the T phase line 58 from phase divider 56 so that a pulse can enter event time line 74 only during T phase time.

A buffer storage loop 80 (FIG. 3D) is provided including a main recirculating delay line 64 with its drive and sense amplifiers 82 and 84, respectively, AND circuits 86 and 88, OR circuit 90, and a three microsecond delay line 92. Three microsecond delay line 92 has an input lead 94 and has taps at one microsecond and two microseconds delay from the input which are connected to leads 96 and 98, respectively. The input to OR circuit 90 is from the output of AND circuit 100 (FIG. 3C). AND circuit 100 has input leads from flip-flop 102, OR circuit 104, and clock means 52. When flip-flop 102 is in its "reset" condition, information can enter the buffer storage loop 80 via OR circuits 104 and 90 during clock pulse periods. The three microsecond delay line 92 with the leads 94, 96, and 98 at one microsecond intervals forms a three bit window within the buffer storage loop 80 which allows three consecutive bits to be detected as they recirculate.

The three leads 94, 96, and 98 are each separated in time by one microsecond. When interrogated at the proper phase time, they provide a means of detecting the start of message mark and the end of message mark, as well as the full buffer storage loop condition and the empty buffer storage loop condition. For example, as can be seen by also referring to FIG. 2, if "1" bits are present on leads 94 and 96 (11 condition) during T phase time, it indicates that a start of message mark is present within the three microsecond delay line 92. Likewise, if a "0" bit is present on lead 94 when a "1" bit is present on lead 96 (01 condition) at T phase time, then an end of message mark is within the three microsecond delay line 92. When the entire buffer storage loop 80 is empty of data, an end of message mark (10) will immediately follow a start of message mark (11) to form a (1110) configuration and this is determined by the condition of a one bit on leads 94, 96, and 98 (111 condition) during D phase time. When the entire buffer storage loop 80 is full, a start of message mark (11) will immediately follow the end of message mark (10) to form a (1011) configuration and this condition is determined by a one bit on lead 94, a zero bit on lead 96, and a one bit on lead 98 (101 condition) during D phase time.

*Transmit mode*

The transmit mode is the mode wherein information is transferred from the typewriter 1 to the transmission line 3. The input sequence occurs in two stages: in the storage sub-mode, characters are entered from the typewriter and stored in the buffer storage loop 80 at a random rate; in the transfer sub-mode, the complete message is transferred, a single bit at a time, from the buffer storage loop 80 to the transmission line.

Assume initially that all flip-flops in the system are reset and the system is in the transmit mode, so that a signal is present on lead 48. The operator depresses the start of message character key on the typewriter which will place a signal on the start of message character line 42 (FIG. 3A) and a pulse on the "any key" line 46. The next D phase pulse from phase divider 56 will condition an AND circuit 106 via lead 60 and set a flip-flop 108 which in turn sets a flip-flop 110 (FIG. 3B) via lead 112 and also routes the next T pulse on lead 58 from phase divider 56 to the event time line 74 by conditioning AND circuit 78 through OR circuit 76. Flip-flop 110, being set, indicates that the system is in the storage sub-mode of the transmit mode. The output of flip-flop 108 on lead 112 is also connected through an OR circuit 114 (FIG. 3C) to assure that flip-flop 102 is in its reset state.

The flip-flop 110 (FIG. 3B) being set conditions AND circuits 116, 118, and 120 via lead 122 and deconditions AND circuit 106 because a signal is removed from lead 124. As previously stated, a pulse has been entered into the event time line 74. One microsecond later a pulse appears on tap D1 of the event time line 74 and is applied to and resets flip-flop 108. The pulses from the taps of the event time line 74 condition AND circuits 126, 128, 130, 26, 28, 30, 32, 34, 36, 38, 40, and 41 (FIG. 3A) in sequence. The pulses from taps D0, D1, and D3 occur during T, D, and D phase times, respectively, and are connected as inputs to AND circuits 126, 128, and 130. AND circuit's 126 other input is the T phase lead 58 from phase divider 56 and AND circuit's 128 other input is the D phase lead 60 from phase divider 56 so that the pulses from taps D0, D1, and D3 of the event time line 74 are gated through OR circuit 132 to AND circuit 116 on lead 134 and through OR circuit 104 on lead 136, through AND circuit 100 and OR circuit 90 and into the buffer storage loop 80 to become a start of message mark (11) and the first character bit which is always a "one" i.e. "space," bit and precedes the eight character bits from the table.

The pulses from taps D5, D7, D9, D11, D13, D15, D17, and D19 of the event time line 74 occur during D phase pulse times and are connected to AND circuits 26, 28, 30, 32, 34, 36, 38, and 40, respectively, along with the D phase lead 60 from phase divider 56. Thus, the signals on input leads 10, 12, 14, 16, 18, 20, 22, and 24 are sequentially gated through to OR circuit 132 during successive D phase times and thence through AND circuit 116, OR circuit 104, AND circuit 100, and OR circuit 90 and into the buffer storage loop 80. At the immediately following T phase time the pulse now at tap D20 of the event time line is gated through AND circuit 41 and then through OR circuit 132, AND circuit 116, OR circuit 104, AND circuit 100, and OR circuit 90 and into the buffer storage loop 80 as an end of message mark (10).

The pulse from tap D21 of the event time line 74 is connected to and gates AND circuit 118, the output of which is connected via lead 138 through OR circuit 140 to set flip-flop 102 thereby providing a signal on lead 142 (and deconditioning AND circuit 100). The signal on lead 142 is connected to AND circuit 88 along with the output of clock means 52 on line 54. This permits the information in the buffer storage loop 80 to recirculate. Thus, the first message character has been entered into the buffer storage loop preceded by a start of message mark and followed by an end of message mark.

For each succeeding character of the message the corresponding key of the keyboard is depressed. This causes a pulse on "any key" lead 46 which conditions AND circuit 120 (FIG. 3B) which is also receiving a signal from flip-flop 110 on lead 122. Upon the occurrence of the next D phase pulse from phase divider 56 on lead 60, AND circuit 120 is gated and flip-flop 146 is set. The output of flip-flop 146 on lead 148 conditions AND circuits 150 and 152 and, through OR circuit 154, provides a signal on lead 156 which causes the keyboard to lock.

For each succeeding character entered, the end of message mark of the preceding character must be found and the start of character bit of the succeeding character must be entered in its place. The end of message mark is detected by AND circuit 150 which senses the presence of a "0" bit on lead 94 and a "1" bit on lead 96 from the three microsecond delay line 92 during T phase time. Lead 94 is fed to inverter circuit 188 so that the presence of a "0" bit on lead 94 is indicated by the presence of a "1" bit signal from the output of the inverter 188. The end of message mark has a "1" bit which occurs at T phase time. Thus, lead 96 from the three microsecond delay line 92 (FIG. 3D) is connected to AND circuit 150 (FIG. 3B) along with the T phase line 58 from phase divider 56 and the output signal from inverter circuit 188. A pulse on lead 96 and an output from inverter circuit 188 at T phase time indicates the end of message mark and AND circuit 150 is gated. The output signal from AND circuit 150 on lead 158 at T phase time is connected through OR circuit 76 (FIG. 3D) and AND circuit 78 to event time line 74. Two microseconds later the 1 bit of the end of message mark has been circulated to the input of OR circuit 90 of buffer storage loop 80. The pulse traveling down the event time line 74 is at this time at tap D2, and tap D2 is connected through AND circuit 152, and thence on lead 160 through OR circuit 114 (FIG. 3C) to reset flip-flop 102 causing AND circuit 100 to be conditioned and AND circuit 88 to be deconditioned. The pulses from taps D3 through D20 gate AND circuits 130, 26, 20, 30, 32, 34, 36, 38, 40, and 41 gating the start of character bit, the data bits of the character, and the end of message mark through OR circuit 132, AND circuit 116, OR circuit 104, AND circuit 100, and OR circuit 90 and into the buffer storage loop, the start of character bit being entered in place of the end of message mark of the preceding character. The pulse from tap D21 of event time line 74 then gates AND circuit 118 (FIG. 3B) and the resulting signal on lead 138 is connected through OR circuit 140 (FIG. 3C) to set flip-flop 102, conditioning AND circuit 88 (FIG. 3D), and degating AND circuit 100. The pulse from tap D23 of event time line 74 resets flip-flop 146 (FIG. 3B) which causes AND circuits 150 and 152 to be degated. This process is repeated for each succeeding character entered from the keyboard until either the recirculating delay line 74 is full or the end of message character key is depressed.

When buffer storage loop 80 is full, an end of message mark will be immediately followed by a start of message mark. This condition is detected by sensing the presence of a start of message mark in the three microsecond delay line 92 three microseconds after an end of message mark has been entered in the buffer storage loop 80 by a pulse on tap D20 of the event time line 74. When this occurs, pulses will be present on leads 94 and 96 of the three microsecond delay line 92 and on tap D26 of the event time line 74. These three leads are connected to AND circuit 162, the output of which is connected through OR circuit 164 (FIG. 3B) to reset flip-flop 110 and to set a flip-flop 166. Flip-flop 166 being set indicates that the system is in the transfer sub-mode of the transmit mode. A message may end before the delay line is full in which event the operator depresses the end of message character key on the keyboard which applies a signal on input lead 44 (FIG. 3A) which is gated through an AND circuit 168 by a pulse from the D23 tap of event time line 74. The output of AND circuit 168 is also connected through OR circuit 164 to reset flip-flop 110 and to set flip-flop 166. The setting of flip-flop 166 applies a signal on lead 170 which conditions AND circuits 172, 174, 176, 178, 198, and 180 (FIG. 3B) and sends a signal through OR circuit 154 on line 156 to lock the keyboard. AND circuit 172 is gated by the occurrence of a start of message mark and therefore has as inputs lead 94 and lead 96 of the three microsecond delay line 92 and the T phase line 58 from the phase divider 56. The occurrence of a start of message mark causes AND circuit 172 to be gated, thereby conditioning AND circuit 182, and further applying a signal via lead 173 through OR circuit 66 and delay means 68 to step the revolution counter 62. Thus, each time the start of message mark passes through the three microsecond delay line 92, AND circuit 172 is gated causing the revolution counter 62 to be stepped, and conditioning AND circuit 182. Every fourth increment of the revolution counter 62 results in a zero count causing an output signal to be applied to output lead 72 which is connected to AND circuit 182 (FIG. 3B). The output signal from AND circuit 182 is connected via line 184 through OR circuit 114 to reset flip-flop 102, causing the signal on lead 142 therefrom to be removed. This has the effect of erasing the start of message mark in the buffer storage loop 80. The output signal from AND circuit 182 on lead 184 is also coupled through OR circuit 76 and AND circuit 78 as an input pulse to the event time line 74. When this pulse in event time line 74 reaches tap D2, the data bit which was immediately following the start of message mark in the buffer storage loop is now at tap 94 of the three microsecond delay line 92. This event occurs during the T phase. Thus, the tap D2 from the event time line 74, the tap 94 from the three microsecond delay line 92, and the T phase line 58 from the phase divider 56 are applied to AND circuit 178 (FIG. 3B) which will be gated if the data bit is a "1" bit.

Figure 3D:
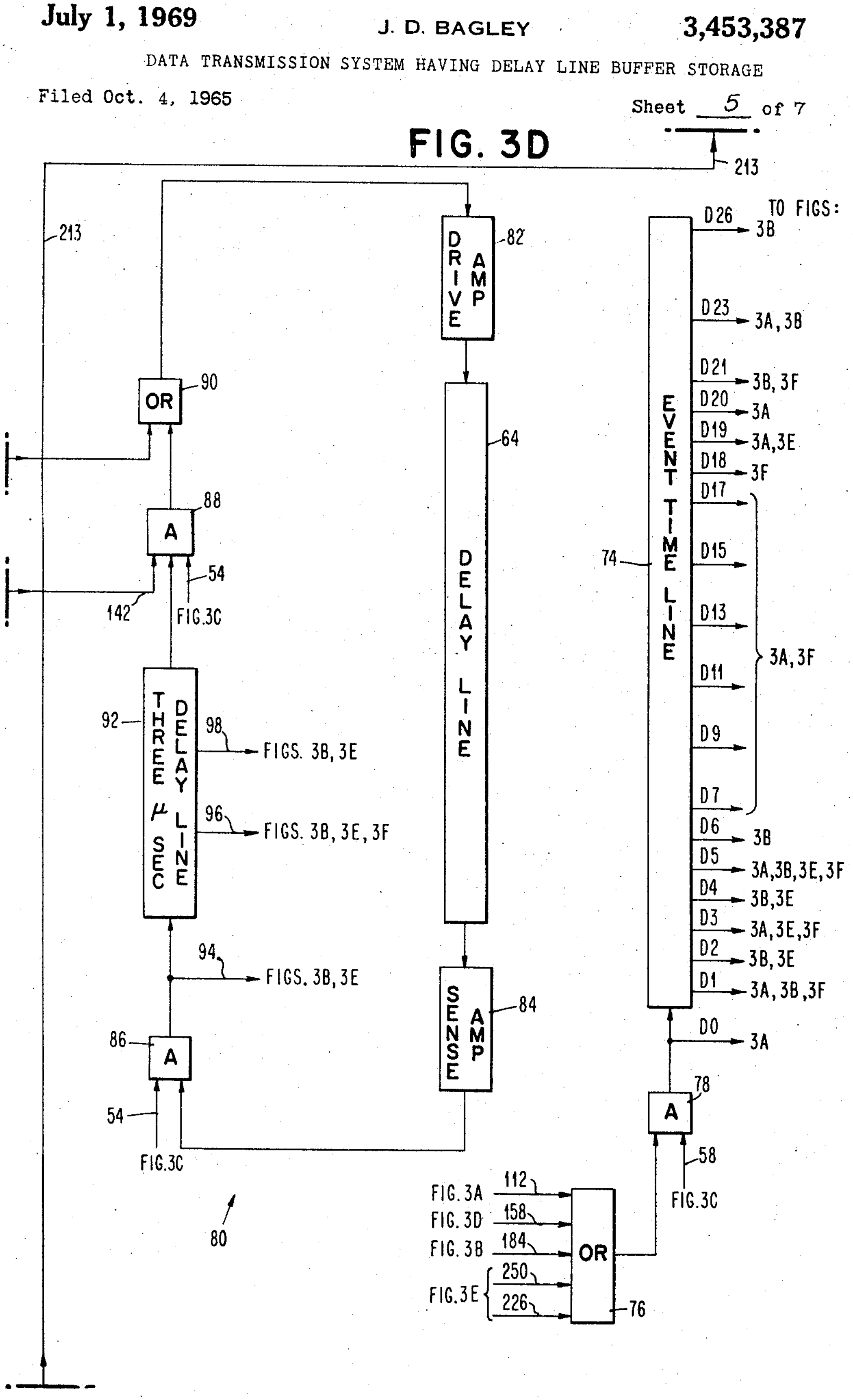

The gating of AND circuit 178 sets flip-flop 186 and provides a "1" bit output to the transmission line. The tap 94 from the three microsecond delay line 92 is also applied through a logical inverter 188 (FIG. 3B), the output of which is connected along with the D2 tap and the T phase line 58 to AND circuit 180. Thus, if the data bit were a "0" bit, AND circuit 180 is gated and the output is applied through OR circuit 190 to reset flip-flop 186 thereby causing a "0" bit output to be applied to the transmission line. The pulse traveling down the event time line 74 will reach the D4 tap at T phase time. The D4 tap and the T phase line 58 are applied to AND circuit 174 which produces an output signal at this time on lead 192 which is coupled through OR circuit 104 and gated through AND circuit 100 (FIG. 3C) and OR circuit 90 to enter into the recirculating buffer storage loop 80 (FIG. 3D). The pulse traveling down the event time line 74 will reach the D5 tap at D phase time. The tap D5 and the D phase line 60 are connected to an AND circuit 176, the output of which on lead 194 is also connected through OR circuit 104, AND circuit 100 and OR circuit 90 to enter the signal into recirculating buffer storage loop 80. These two pulses on leads 192 and 194 effectively place a new start of message mark in the recirculating buffer storage loop 80 in place of the data bit which was just applied to the transmission line.

The pulse continues to travel down the event time line 74 and will reach tap D6 at T phase time. Tap D6 and the T phase lead 58 are connected to an AND circuit 198 which is gated at this time and applies a signal on lead 200 which is connected through OR circuit 140 and sets flip-flop 102 which produces a signal on lead 142 which conditions AND circuit 188 and allows the buffer storage loop 80 to recirculate.

The new start of message mark in the buffer storage loop 80 again serves to increment the revolution counter 62 four times until a zero count is reached and a signal therefrom is produced on lead 72 and the data bit succeeding the new start of message mark is transferred out to the transmission line. This process continues with a bit being removed every fourth revolution of the buffer storage loop 80 until the buffer storage is empty. When the buffer storage loop 80 is empty, a start of message mark will immediately be followed by an end of message mark. When this condition occurs, a signal will be present on leads 94, 96, and 98 from the three microsecond delay line 92 at D phase time. In order to insure that the last pulse sent to the transmission line is of the proper duration, this start of message must be allowed to circulate in the buffer storage loop 80 exactly four times. When it has, this condition is detected by AND circuit 182 and a pulse is sent down the event time line 74 via lead 184, OR circuit 76, and AND circuit 78. When the pulse in the event time line 74 reaches tap D1, and the buffer storage loop 80 is empty, the start of message mark and the end of message mark will be on leads 94, 96, and 98 of the three microsecond delay line 92 at D phase time. Thus, the leads 94, 96, 98, and D1 are combined along with the D phase line 60 at AND circuit 202 (FIG. 3B) which is gated and produces a signal on output lead 204 which is connected through OR circuit 190 and resets flip-flop 186. The signal on output lead 204 from AND circuit 202 also resets flip-flop 166 (FIG. 3B) which degates AND circuits 172, 174, 176, 178, and 180 and no further information can be transferred to the transmission line. This terminates the transfer sub-mode of the transmit mode.

*Receive mode*

The preceding discussion related to the transmit mode and more particularly to the storage sub-mode of the transmit mode where a message is transferred from the keyboard into the recirculating delay line and to the transfer sub-mode of the transmit mode wherein the stored message in the recirculating delay line is removed and transferred to the transmission line. The receive mode, now to be described, also includes two sub-modes. The storage sub-mode wherein a character is transferred from the transmission line to the recirculating delay line and the transfer sub-mode of the receive mode where the character within the delay line is read out to the typewriter for printing.

Figure 3E:
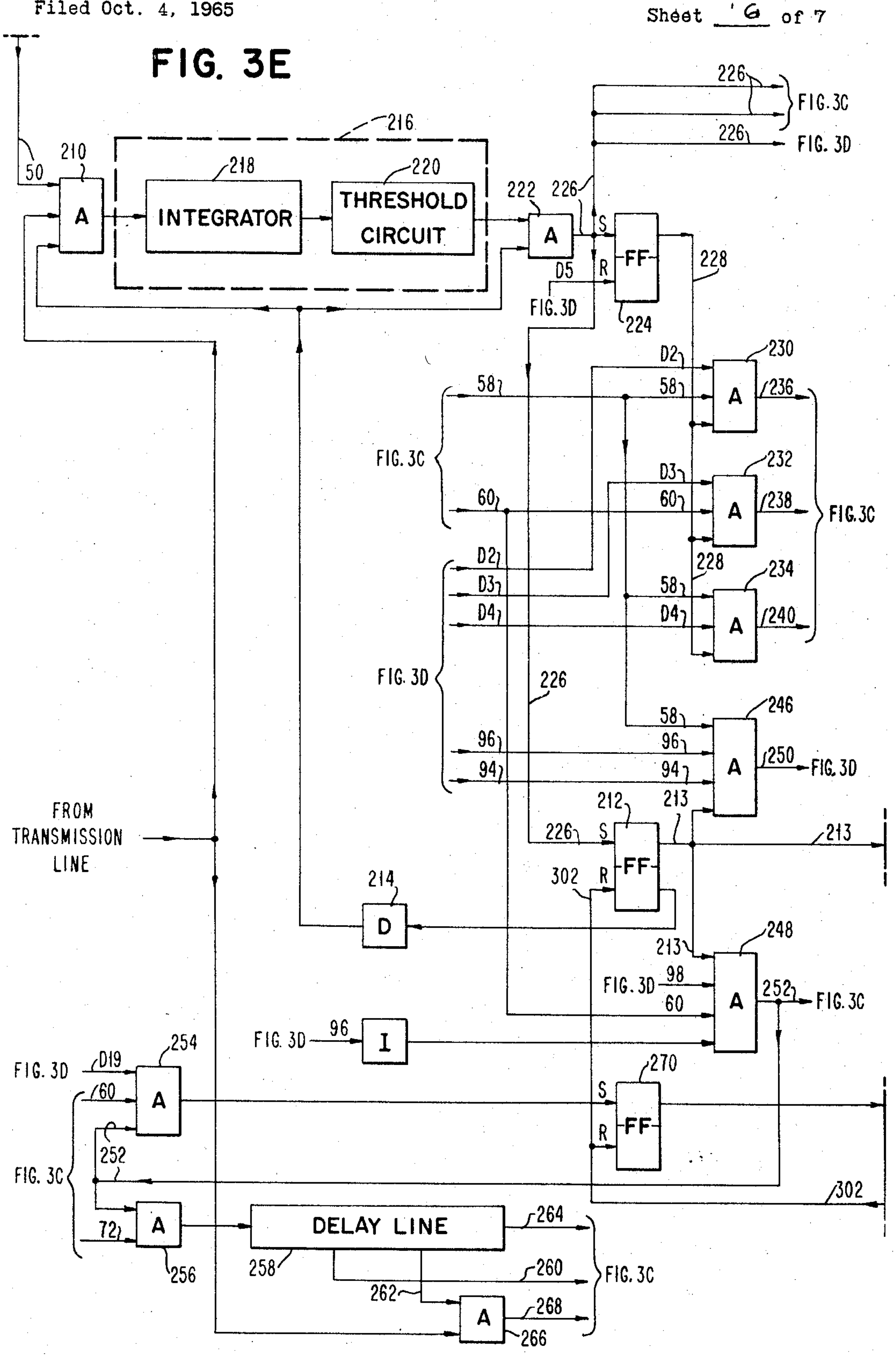
Figure 3F:
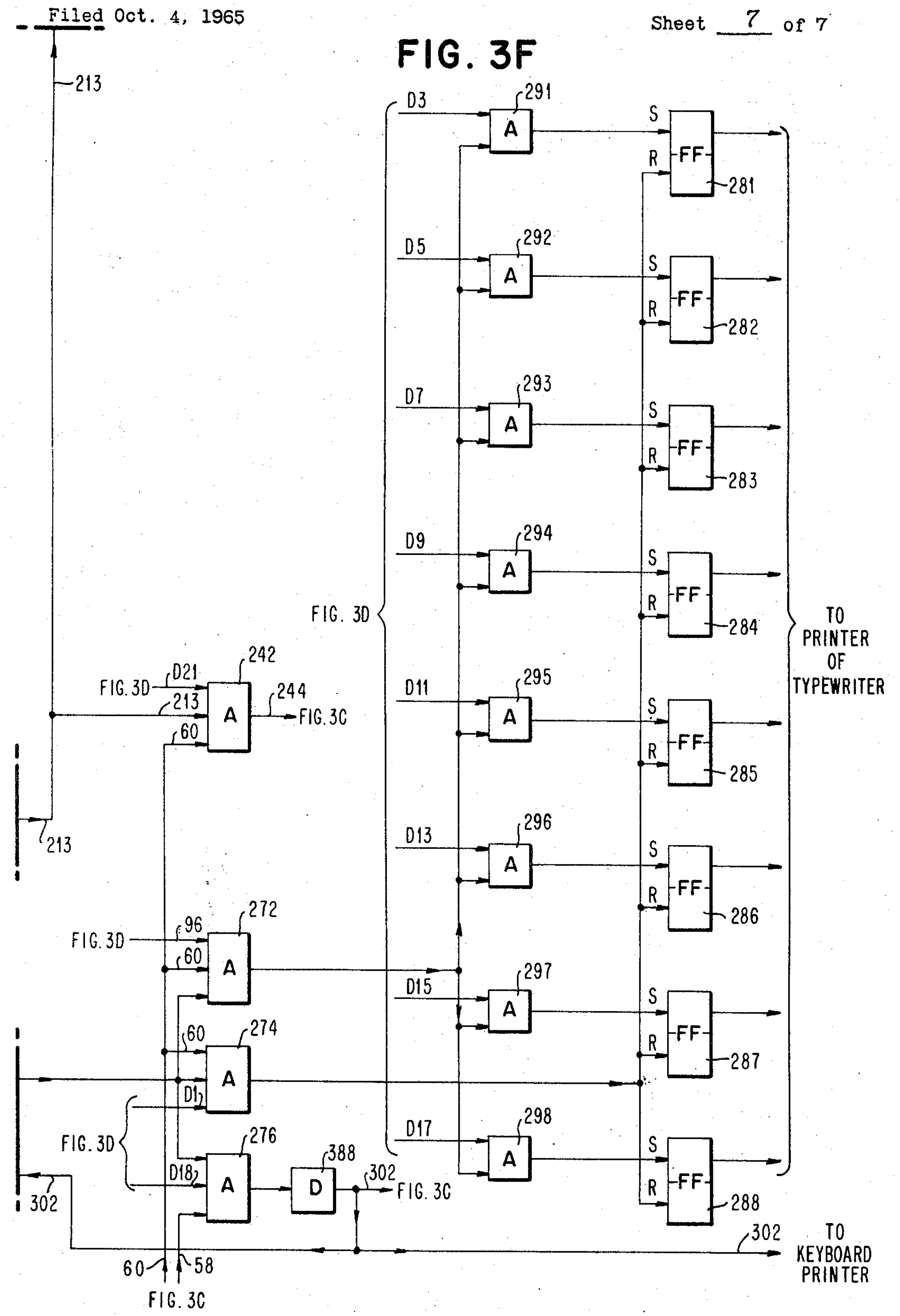

In the receive mode, receive lead 50 (FIG. 3A) contains a signal and transmit lead 48 does not. Once again it is assumed that all the flip-flops in the system are reset. The first bit of a character is always the start of character bit and is always a "1" bit. This is received from the transmission line and applied into AND circuit 210 (FIG. 3E) where it is gated with the signal on receive lead 50 and the output of flip-flop 212 which is passed through a ½ microsecond delay in delay element 214. The output of AND circuit 210 is applied to an integrating delay network 216. The purpose of the integrating delay network 216 is to detect the approximate center of the start character bit coming in from the transmission line through AND circuit 210. The integrating delay network 216 consists of an integrator 218 in series with a threshold detector 220. The start character bit input to the integrator 218 is essentially a step function, therefore, the output from integrator 218 is a ramp voltage, that is, a voltage whose value increases proportionally with time. After a predetermined time the output of the integrator 218 reaches a value sufficient to activate the threshold detector 220 and the output of the threshold detector 220 rises abruptly. Thus, the output of the integrating delay network 216 is essentially a step signal which is delayed by a fixed time from the input start character bit. The fixed time is determined by the integrator time constant and the threshold voltage and is in the present system fixed at a period equal to one-half of the duration of a "1" bit pulse on the transmission line. The output of the integrating delay network 216 is applied to an AND circuit 222 along with the output of the ½ microsecond delay network 214. Thus, AND circuit 222 is gated on at the center of the start character bit. The output from AND circuit 222 is applied to and sets the flip-flop 212 and the flip-flop 224. The output from AND circuit 222 on lead 226 is also coupled through OR circuit 76 (FIG. 3D) and AND circuit 78 to send a pulse down the event time line 74. It is also coupled through OR circuit 114 (FIG. 3C) to reset flip-flop 102 and is applied to the revolution counter 62 to reset it. One-half microsecond after flip-flop 212 (FIG. 3E) has been set, the output from delay means 214 ceases and AND circuits 210 and 222 are degated. Flip-flop 224, having been set, the output therefrom on lead 228 is applied to AND circuits 230, 232, and 234. The other inputs to AND circuit 230 are the D2 tap from the event time line 74 and the T phase line 58 from the phase divider 56. The other inputs to AND circuit 232 are the D3 tap from the event time line 74 and the D phase line 60 from the phase divider 56. The other inputs to AND circuit 234 are the D4 tap from the event time line 74 and the T phase line 58 from the phase divider 56. Thus, as the pulse travels down the event time line 74 AND circuits 230, 232, and 234 are gated, respectively, at T, D, and T phase time. The output leads from AND circuits 230, 232, and 234 which are leads 236, 238, and 240, respectively, are coupled through OR circuit 104 (FIG. 3C), AND circuit 100, and OR circuit 90 and are entered into the recirculating buffer storage loop 80 at T, D, and T phase times as a start of message mark (11) followed by an end of message mark (10). The D5 tap of the event time line 74 is connected as a reset lead to flip-flop 224 (FIG. 3E) so that the pulse traveling down the event time line resets the flip-flop 224 when it reaches tap D5. The pulse continues down the event time line until it reaches tap D21 which is coupled along with the D phase line 60 as inputs to an AND circuit 242 (FIG. 3F). AND circuit 242 is gated and the output therefrom on lead 244 is coupled through OR circuit 140 (FIG. 3C) to set the flip-flop 102 which degates AND circuit 100 and conditions AND circuit 88 which closes the buffer storage loop 80. Note that the output from flip-flop 212 (FIG. 3E) is connected through OR circuit 154 (FIG. 3B) to provide an output signal on the lead 156 which locks the keyboard. The output from flip-flop 212 is also connected to and conditions AND circuits 246 and 248. When the start of message mark entered and recirculating in the buffer storage loop 80 enters the three microsecond delay line 92, pulses will be present on taps 94 and 96 at T phase time. Thus, taps 94 and 96 and the T phase lead 58 from the phase divider 56 are connected into AND circuit 246 (FIG. 3E) which is gated and provides an output on lead 250 which is connected through OR circuit 76 (FIG. 3D) and AND circuit 78 and is routed into the event time line 74. When the end of message mark which is recirculating in the buffer storage loop 80 enters the three microsecond delay line 92, "0" and "1" bit output signals are present at leads 96 and 98, respectively, at D phase time. The signal on lead 96 is applied through an inverter circuit (FIG. 3E) and the inverted output thereof applied to AND circuit 248. Thus, when a "0" bit signal is present on lead 96, a "1" bit lead is applied to AND circuit 248. Thus, lead 98 and the D phase line 60 from the phase divider 56 are connected as inputs to the AND circuit 248 which is gated and applies a signal on lead 252 through OR circuit 66 and delay circuit 68 to step the revolution counter 62. The output from AND circuit 248 on lead 252 is also applied to and conditions AND circuits 254 and 256. Because of the action of AND circuit 248, every time the end of message mark passes through the three microsecond delay line 92 within the buffer storage loop 80, the revolution counter 62 is incremented one step.

Revolution counter 62 being incremented by the output of AND circuit 248 on lead 252 each time the end of message mark is within the three microsecond delay line 92, it follows that the revolution counter 62 will be incremented every revolution of the buffer storage loop 80 and that a zero count signal will be applied to output lead 72 of the revolution counter 62 for every forth revolution of the buffer storage loop 80. The output lead 72 from the revolution counter 62 is applied to and gated through AND circuit 256 into a three micro-second delay line 258 (FIG. 3E). Delay line 258 has three output taps 260, 262, and 264 located at one microsecond intervals. When the output signal from AND circuit 256 entered into delay line 258 reaches output tap 260, it is conducted through OR circuit 114 and resets flip-flop 102 causing the signal on lead 142 to cease. This has the effect of erasing the end of message mark circulating within delay line loop 80. One microsecond later, an output is present on tap 262 of delay line 258 and is applied to AND circuit 266. The other input to AND circuit 266 is from the transmission line and is gated through OR circuit 104 via lead 268 and then through AND circuit 100 and 49 circuit 90 and into the buffer storage loop 80. Thus, a sample of the data bit from the transmission line is entered into the buffer storage loop 80. One microsecond later there is an output signal on tap 264 of the delay line 258 (FIG. 3E). This is connected through OR circuit 104, AND circuit 100, and OR circuit 90 during T phase time and serves as a new end of message mark following the data bit just entered from the transmission line. This same sequence repeats every fourth revolution of the recirculating buffer storage loop 80, that is, the previous end of message mark is erased, a data bit from the transmission line is entered in its place, and a new end of message mark is entered following the data bit. The sequence continues until eight data bits from the transmission line are stored in the buffer storage loop 80.

One revolution after the eighth and last bit of the character from the transmission line has been inserted into the buffer storage loop 80, AND circuit 254 is gated because at this time the end of message mark is in the three microsecond delay line 92 (producing an output from AND circuit 248 on lead 252 at the same time the pulse in the event time line 74 is at tap D19 at D phase time). The output from AND circuit 254 is applied to and sets a flip-flop 270 (FIG. 3E) initiating the transfer submode of the receive mode. The output of flip-flop 270 is applied to and conditions AND circuits 272, 274, and 276 (FIG. 3F). The next time that the start of message mark reaches the three microsecond delay line 92 it is detected as usual by AND circuit 246 which provides an output on lead 250 which is connected through OR circuit 76 (FIG. 3D) and AND circuit 78 and is entered into the event time line 74. One microsecond later the pulse appears at tap D1 of event time line 74 and is connected to AND circuit 274 along with the D phase line 60 from the phase divider 56. AND circuit 274 is gated and the output therefrom on lead 278 is applied to and resets the eight flip-flops 281 through 288.

Flip-flops 281 through 288 are referred to as the printer register and the eight output leads therefrom are connected to the printer mechanism of the keyboard. That is, whereas leads 10, 12 14, 16, 18, 20, 22, and 24 were input leads from the typewriter which contain signals representative of depressed keys, the output leads from flip-flops 281 through 288 represent input leads to the typewriter which, when selectively energized, cause representative print elements to print in accordance with the code shown in the table. The flip-flops 281 through 288, having been reset by the output signal from AND circuit 274, there are no signals present on the output leads therefrom but the flip-flops 281 through 288 are in condition to be activated by AND circuits 291 through 298. The pulse which, when at tap D1 of event time line 74, activated AND circuit 274, then continues to travel down the event time line 74. Tap D3 of the event time line 74 is connected to AND circuit 291. Tap D5 therefrom is connected to AND circuit 292, tap D7 to AND circuit 293, tap D9 to AND circuit 294, tap D11 to AND circuit 295, tap D13 to AND circuit 296, tap D15 to AND circuit 297, and tap D17 to AND circuit 298. The other inputs to the AND circuits 291 through 298 are from the output of AND circuit 272. The other inputs to AND circuit 272 are the D phase line 60 from phase divider 56 and tap 96 from the three microsecond delay line 92 within the delay line storage loop 80. The data bits of the character will be present at tap 96 of the three microsecond delay line 92 at D phase time. If a data bit (i.e., "1" bit) is present, AND circuit 272 is gated conditioning the AND circuits 291 through 298. The AND circuits 291 through 298 are gated in sequence as the pulse travels down the event time line 74 and appears at taps D3, D5, D7, etc. The ones of AND circuits 291 through 298 which are gated cause corresponding ones of flip-flops 281 through 288 to become set and provide an output signal on the output leads therefrom. Thus, the "1" bits of the eight bit character stored in the delay line storage loop 80 are translated into signals on associated ones of the output leads from flip-flops 281 through 288. For example, if the eight bit character had a "1" bit in the first bit position, when this "1" bit appeared at tap 96 of the three microsecond delay line 92 at D phase time, AND circuit 272 would be gated and AND circuits 291 through 298 would be conditioned. At the same time the signal in the event time line 74 at tap D3 will gate AND circuit 291 thereby setting flip-flop 281 and providing an output signal on the lead therefrom. If the second bit of the eight bit character stored in the delay line loop 80 were a "0" bit, then AND circuit 272 would not be gated due to an absence of a pulse from tap 96 of the three microsecond delay line 92. Thus, when the signal on tap D5 of the event time line is applied to AND circuit 292 it will not be gated and the flip-flop 282 connected thereto will remain in its reset state and the output lead therefrom will contain no signal. In like manner, the binary eight bit character is manifested on the output leads from flip-flops 281 through 288.

The pulse traveling down the event time line 74 reaches tap D18 during T phase time. Thus, tap D18 and the T phase line 58 from phase divider 56 are connected as inputs to AND circuit 276 which gates and provides a pulse to a ½ microsecond delay network 388. The output from the ½ microsecond delay network 388 is applied via lead 302 as a pulse to initiate the print cycle, that is, it energizes the print motor of the typewriter to allow the appropriate print element to be depressed in accordance with the output signals from flip-flops 281 through 288. The signal on lead 302 is also applied directly as a reset pulse to flip-flops 212 and 279 and through OR circuit 114 as a reset pulse for flip-flop 102. The resetting of flip-flop 212 causes a signal to be applied to the ½ microsecond delay network 214. The output of delay network 214 conditions AND circuit 210 and AND circuit 222. Conditioning AND circuit 210 allows the next start of character bit to enter the integrating delay network 216. It is to be noted that the signal on lead 302 which initiated the print cycle when applied to flip-flop 212 also removed the signal on the lead 213 which was the input to OR circuit 154 and therefore the keyboard becomes unlocked to permit the start of a new transmit mode if desired.

It is seem from the preceding discussion that a system has been provided wherein a message may be composed on a keyboard and transferred to a transmission line via a buffer storage loop means or the message may arrive on the transmission line and be transferred to the typewriter means for printing out. The delay line buffer means permits the message to begin and end at any time without restriction. A message may be removed from the delay line buffer means and another message inserted with no regard to the cycling sequence of the delay line during the previous message. Within the delay line buffer means the data and control marks are represented by two bits per byte, and this coding in cooperation with a three microsecond delay line window permits simple detection of start of message marks, end of message marks, an empty delay line condition, or a full delay line condition. Further, the generation of start of message marks and end of message marks within the delay line buffer means is accomplished quite simply and therefore erasures of prior marks and reinsertion of new marks is possible.

The invention has been described in relation to the circuits of FIGS. 3A through 3F, and in the interests of providing a complete embodiment, the delay times of the various delay elements set forth in the figures are set forth as follows:

| | Microseconds |
|---|---|
| Delay circuit **68** | 0.5 |
| Delay line **258** | 3.0 |
| Delay circuit **214** | 0.5 |
| Event time line | 26.0 |
| Delay circuit **388** | 0.5 |

What is claimed is:

1. A transmission system comprising a first terminal for serially transmitting and receiving information characters, each character being coded as $n$ parallel binary bits, a second terminal for serially transmitting and receiving information characters, each character being coded as $n+1$ serial binary bits, and a buffer storage connected between said first and second terminals, said buffer storage comprising;

a recirculating storage device for storing the bits of a plurality of character codes, means to read bits individually from said storage device, a second reading means to determine the presence of a start message characted or an end of message character at said first reading means, control means operative when one or more character bits are received for storage and said end of message character is detected to replace said end of message character with said bits of said character followed by a new end of message character, and a further control means operative when one or more character bits are to be transmitted from storage and said start of message character is detected to prevent recirculation of said start of message character and the character bit or bits to be transmitted and to record a new start of message character in place of the last bit to be transmitted.

2. A transmission system according to claim 1 wherein said recirculating storage device has sufficient capacity to store the bits of a plurality of $n+1$ characters, said start of message character, and said end of message character, and a transmit mode control means settable to a first submode when said second reading means detects that said start of message character is followed immediately in said storage device by said end of message character to enable storage of the bits of plural bit characters received from said first terminal and settable to a second sub-mode when said second reading means detects that said start of message character is immediately preceded in said recirculating storage device by said end of message character to start serial transmission of said stored bits to said second terminal.

3. A transmission system according to claim 1 wherein said buffer storage may be set into a receiving mode, a first sub-mode control device settable when said buffer storage is in a receive mode by the receipt of a start of character signal from said second terminal to enter a start of message and an end of message character into said recirculating storage device and to thereafter regularly enter into said storage device a bit indicating the state of the output of said second terminal, and a character completion detecting means rendered effective when $n$ data bits have been stored in said storage device to transmit said bits in parallel as a character to said first terminal.

4. A transmission system comprising a first terminal for serially transmitting and receiving information characters, each character being coded as $n$ parallel binary bits, a second terminal for serially transmitting and receiving information characters, each character being coded as $n+1$ serial binary bits, and a buffer storage connected between said first and second terminals, said buffer storage comprising;

a recirculating storage means, a control means operating in a first mode for storing in said storage means a plurality of $n+1$ bit characters transmitted from said first terminal as $n$-bit characters and for transmitting from said storage means said plurality of stored $n+1$ bit characters to said second terminal in a serial by bit, serial by character manner, said control means operating in a second mode for storing as an $n$-bit character each $n+1$ bit character transmitted as serial bits from said second terminal and transmitting each character to said first terminal in an $n$-bit parallel manner prior to storing each succeeding character from said second terminal, a pulse generating means for producing unique start of message and end of message marks, and gating means connected to said pulse generating means and said storage means for inserting in said storage means a start of message mark and a start of character mark immediately preceding the first of said $n$-bit characters transmitted from said first terminal and for inserting an end of message mark immediately after the first of said $n$-bit characters transmitted from said first terminal, and for thereafter inserting succeeding $n$-bit characters from said first terminal into said storage means with a start of character mark to replace said stored end of message mark and for inserting another end of message mark immediately after said $n$-bit character.

5. A transmission system comprising a first terminal for serially transmitting and receiving information characters, each character being coded as $n$ parallel binary bits, a second terminal for serially transmitting and receiving information characters, each character being coded as $n+1$ serial binary bits, and a buffer storage connected between said first and second terminals, said buffer storage comprising;

a recirculating storage element, a control means operating in a first mode for storing a plurality of $n+1$ bit characters transmitted in parallel from said first terminal as $n$-bit characters and transmitting said plurality of stored $n+1$ bit characters to said second terminal in a serial by bit, serial by character manner, and said control means operating in a second mode for storing as an $n$-bit character each $n+1$ bit character transmitted as serial bits from said second terminal and transmitting each character to said first terminal in an $n$-bit parallel by bit manner prior to storing each succeeding character from said second terminal, a pulse generating means for producing a series of alternately occurring data pulses and timing pulses, said data pulses occurring on a first output lead of said pulse generating means and said timing pulses occurring on a second output lead from said pulse generating means, and gating means connected to said first and second output leads of said pulse generating means, to said control means and to said recirculating storage element, said gating means being controlled to gate said $n$-bits in parallel of said $n$-bit characters from said first terminal in said first mode and said $n+1$ serial bits per character from said second terminal in said second mode into said recirculating storage element as $n+1$ and as $n$-bits, respectively, in time coincidence with given ones of said data pulses from said pulse generating means.

6. A transmission system according to claim 5 wherein said third terminal includes mark control circuits connected to said gating means and wherein said circuits energize said gating means to gate certain of said timing and data pulses into said recirculating storage element, said pulses being gated into said recirculating storage means as control marks preceding and succeeding said character bits stored therein.

7. A transmission system according to claim 6 wherein said recirculating storage element is a recirculating delay line loop having a plurality of output leads connected thereto, said plurality of output leads being connected to said delay line at predetermined points separated by predetermined segments of said delay line, and wherein said third terminal further includes means connected to said plurality of output leads of said delay line and responsive to the signals circulating in said delay line for determining the presence of significant bits of characters stored therein and the location of said control marks.

8. A buffer terminal for a transmission system for binary coded messages composed of $n$-bit characters with each transmitted $n$-bit character being preceeded by a specific start of character mark, said buffer terminal including;

an input means receiving said transmitted characters, a recirculating delay line storage device, a pulse generator for producing alternate timing phase and data phase pulses on first and second output leads respectively, a gating means for said recirculating delay line storage to enter pulses therein and to eliminate pulses circulating therein, control means connected to said gating means and to said input means and settable in a first mode to be responsive to detection of a start of character pulse on said input means to gate certain of said timing phase pulses and one of said data phase pulses into said storage as adjacent start of character and end of character marks, said control means thereupon shifting to a second mode wherein at each successive pulse time of said input means said control means controls both the deletion of said end of character mark from said storage, its replacement with one of said data pulses if a pulse is present on said input means and the entry of one of said timing phase pulses as a new end of character mark following said replacement pulse position.

9. A transmission system according to claim 8 wherein the time interval between the appearance of bits of said transmitted characters is $k$ times the recirculating time of said storage device, said buffer terminal including, a synchronizing device coupled to said input means for detecting said specific start of character mark and effective at the center of the mark for activating said control means to enter said start and end of message marks and setting said control means in its second mode, said synchronizing device also including, means including a counter active in said second control mode for detecting each time said end of message mark is circulated through said storage and for applying an input gating signal each $k$th time said end of character mark is detected whereby said $n$-bits of said characters are gated into said storage at the bit rate of said characters.

10. A transmission system as in claim 9 including;

means responsive to each circulation of said start of message mark to test for the number of character bits stored in said recirculating storage, means responsive to detection of the presence of the $n$-bits of a character in said storage to set said control means into a third mode, and a plurality of settable output devices settable in accordance with the stored bits of a character, said control means in its third mode setting said gating means to prevent further recirculation of pulses through said storage and setting said output devices.

References Cited

UNITED STATES PATENTS

| | | | |
|---|---|---|---|
| 2,979,564 | 4/1961 | Blodgett | 178—2 XR |
| 3,009,988 | 11/1961 | Kleinschmid et al. | 178—2 |
| 3,280,256 | 10/1966 | Clark et al. | 178—175 XR |
| 3,368,028 | 2/1968 | Windels et al. | 178—23 |

THOMAS A. ROBINSON, *Primary Examiner.*

U.S. Cl. X.R.

178—2, 23